US008798804B2

(12) United States Patent  
Besore et al.

(10) Patent No.: US 8,798,804 B2
(45) Date of Patent: Aug. 5, 2014

(54) ADDED FEATURES OF HEM/HEG USING GPS TECHNOLOGY

(75) Inventors: John K. Besore, Prospect, KY (US); Michael Beverle, Pewee Valley, KY (US); Timothy Worthington, Crestwood, KY (US); Elizabeth Kurfess, Louisville, KY (US)

(73) Assignee: General Electric Company, Schenectady, NY (US)

( * ) Notice: Subject to any disclaimer, the term of this patent is extended or adjusted under 35 U.S.C. 154(b) by 574 days.

(21) Appl. No.: 12/985,387

(22) Filed: Jan. 6, 2011

(65) Prior Publication Data

US 2012/0179547 A1   Jul. 12, 2012

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01M 1/38 | (2006.01) |
| G05B 21/00 | (2006.01) |
| G05D 23/00 | (2006.01) |
| G05B 13/00 | (2006.01) |
| G05B 15/00 | (2006.01) |
| G08C 19/12 | (2006.01) |
| G08B 1/08 | (2006.01) |
| G08B 21/00 | (2006.01) |

(52) U.S. Cl.
USPC ........... 700/296; 700/275; 700/291; 700/297; 340/13.24; 340/539.13; 340/539.14; 340/686.6; 236/51

(58) Field of Classification Search
CPC ..... F24F 1/00; F24F 11/0012; F24F 11/0034; F24F 11/0086; F24F 11/0009; F24F 11/006; F24F 2011/0091; F24F 2011/0047; F24F 2011/0068; F24F 2011/071; F24F 2011/0073; F24F 2011/0075; G05B 15/02; G05B 2219/23136; G05B 2219/2614; G05B 2219/2642; G05D 23/1902; G05D 23/1904; G05D 23/1923; G06F 1/3203; G06F 1/3209; G08C 17/02; G08C 2201/42; H04L 12/2803; H04L 12/2825; H04L 43/08; H04L 67/125; H04L 67/18; H04M 1/72572; H04M 2250/10; H04W 4/021; H04W 4/04
USPC ......... 700/275, 276, 278, 286, 291, 295, 296, 700/302, 11, 22, 297; 715/700, 733, 744, 715/745, 741, 742, 747; 340/500, 531, 340/539.1, 539.22, 539.23, 1.1, 5.1, 5.2, 340/5.74, 13.2, 13.24, 13.25, 539.11, 340/539.13, 539.14, 539.26, 539.3, 686.1, 340/686.6; 236/51; 455/414.1–414.3; 701/400, 408, 521
See application file for complete search history.

(56) References Cited

U.S. PATENT DOCUMENTS

| | | | |
|---|---|---|---|
| 7,574,661 B2 * | 8/2009 | Matsuura et al. | 715/745 |
| 8,108,076 B2 * | 1/2012 | Imes et al. | 700/278 |
| 8,224,496 B2 * | 7/2012 | Musti et al. | 700/295 |

(Continued)

*Primary Examiner* — Crystal J Barnes-Bullock
(74) *Attorney, Agent, or Firm* — Global Patent Operation; Marc A. Vivenzio

(57) ABSTRACT

A GPS-based energy management system for a home network is provided that includes a plurality of energy consuming devices. The system comprises a central controller operatively connected to each energy consuming device, and one or more GPS-enabled devices configured to communicate with the central controller. The central controller is programmed to modify the behavior of the energy consuming devices based on the location of at least one member of a home network.

13 Claims, 4 Drawing Sheets

(56) References Cited

U.S. PATENT DOCUMENTS

| | | | |
|---|---|---|---|
| 8,350,697 B2* | 1/2013 | Trundle et al. | 340/539.3 |
| 8,428,782 B2* | 4/2013 | Imes | 700/286 |
| 2006/0012489 A1* | 1/2006 | Yokota et al. | 340/825.72 |
| 2011/0202181 A1* | 8/2011 | Lee et al. | 700/276 |
| 2012/0061480 A1* | 3/2012 | Deligiannis et al. | 236/51 |
| 2012/0065802 A1* | 3/2012 | Seeber et al. | 700/295 |

\* cited by examiner

ADDED FEATURES OF HEM/HEG USING GPS TECHNOLOGY

BACKGROUND OF THE DISCLOSURE

The following disclosure relates to energy management, and more particularly to energy management of household consumer appliances, as well as other energy consuming devices and/or home energy systems found in the home. The present disclosure finds particular application to coupling a home energy management system (HEM)/home energy gateway (BEG) with coordinate-based location devices that will allow the HEM/HEG to track the home member's location based on time and control home devices and/or appliances accordingly.

Many utilities are currently experiencing a shortage of electric generating capacity due to increasing consumer demand for electricity. Currently utilities charge a flat rate, but with increasing cost of fuel prices and high energy usage at certain parts of the day, utilities have to buy more energy to supply customers during peak demand, which causes prices to rise during these times. If peak demand can be lowered, then a potential huge cost savings can be achieved and the peak load that the utility has to accommodate is lessened. In order to reduce high peak power demand, many utilities have instituted time of use (TOU) metering and rates which include higher rates for energy usage during on-peak times and lower rates for energy usage during off-peak times. As a result, consumers are provided with an incentive to use electricity at off-peak times rather than on-peak times and to reduce overall energy consumption of devices at all times.

Home Energy Management (HEM) systems have been developed and described in U.S. patent application Ser. No. 12/892,130, fully incorporated by reference herein, that can automatically operate and disable power consuming devices in a designated home network. The energy management systems include a central controller that is in communication with each of the power consuming devices and provide a homeowner the means to monitor and manage their energy consumption through a combination of behavior modification and programmed control logic. Active and real time communication of energy costs of power consuming devices to the consumer enables informed choices of operating the power consuming functions of the appliance. One type of HEM is in the form of a special custom configured computer with an integrated display, which communicates to devices in the home and stores data, and also has simple algorithms to enable energy reduction. This type of device may include a keypad for data entry or the display may be touch screen. This device is either integrated in a unitary housing, or if the display is not in the same housing, the display and computer are otherwise connected/associated to work as a single unit. A second HEM is in the form of a low cost router/gateway device in a home that collects information from devices within the home and sends it to a remote server and in return receives control commands from the remote server and transmits the commands to energy consuming devices in the home. As with the first, this HEM may be custom configured including a computer and integrated or otherwise connected/associated display (and keypad if used) designated as a single unit.

Additionally, a Home Energy Gateway (HEG) system has been developed as a premise data management system that is significantly smaller, cheaper, and consumes less power, as described in U.S. patent application Ser. No. 12/983,425, fully incorporated herein by reference. The HEG has the capability of operating over multiple communication networks which each use different formats, protocols, and bandwidths. This allows the HEG to acquire and manipulate (e.g. reformat) data of one communication network (e.g., that which monitors/controls the home appliances) and to supply that manipulated data to another communication network (e.g. to the consumer electronics network, such as to a home computer, smart phone, web-enabled TV, etc.), even though these networks are not generally compatible.

To take advantage of the lower cost of electricity during off-peak times, the HEM/HEG systems are designed automatically operate power consuming devices during off-peak hours in order to reduce consumer's electric bills and also to reduce the load on generating plants during on-peak hours. Active and real time communication of energy costs of devices to the consumer enables informed choices of operating the power consuming functions of the devices. Although these systems are capable of being run automatically according to demand period, a user may choose to override the system and run a device normally, or delay the operation of the system for a particular period of time.

The HEM/HEG is designed to operate home network power consuming devices and provide homeowners with power and cost saving information. It would be advantageous, however, to enable operation of the home network in view of the locations of home network members, such as when such members are at home or away from the home.

Navigation systems, such as global positioning systems (GPS), vehicle compass, distance sensors, and other navigation systems are being included in devices such as vehicles, cellular telephones, and other portable devices, to provide navigation and location information-based information to users. Global Positioning Systems (GPS) are widely used as space-based global navigation systems that provide reliable location and time information in all weather and at all times anywhere on earth.

Accordingly, it would be beneficial to utilize the positioning capability of GPS and other navigation devices to provide an HEM/HEG with the positional information of home network members to allow an HEM/HEG to control the home network devices based on the member's location.

SUMMARY OF THE DISCLOSURE

According to one aspect of the present disclosure, a GPS-based energy management system for a home network is provided that includes a plurality of energy consuming devices. The system comprises a central controller operatively connected to each energy consuming device, and one or more GPS-enabled devices configured to communicate with the central controller. The central controller is programmed to modify the behavior of the energy consuming devices based on the location of at least one member of a home network.

According to yet another aspect of the present disclosure, an energy management system configured to operate a home network based on the location of one or more members of the home network is provided. The system comprises one or more energy consuming devices, a central controller operationally coupled to a home network of power consuming devices and programmed to modify the behavior of the energy consuming devices, and at least one navigation device corresponding to at least one member of the home network. The navigation device is configured to communicate with the controller.

According to yet another aspect of the present disclosure, a method of managing a home energy management system based on the location of one or more members of a home network is provided. The energy management system includes a network of energy consuming devices and a central controller operatively connected to the energy consuming devices. The method comprises communicatively coupling a GPS-enabled device to the central controller, determining the location of one or more members using the GPS-enabled device, communicating the location of one or more members to the central controller, and operating one or more energy consuming devices according to a pre-programmed schedule when designated location criteria is met.

DETAILED DESCRIPTION OF THE PREFERRED EMBODIMENTS

As briefly described above, the home energy management system comprises an electronic system having a home energy manager (HEM)/home energy gateway (HEG) acting as a central controller operationally coupled to a home network of power consuming devices that provides a homeowner the means to monitor and manage their energy consumption through a combination of behavior modification and programmed control logic. The central controller provides real-time feedback on electricity, water, and/or natural gas consumption as well as providing data on renewable energy generation occurring at the home, such as solar photovoltaic generation, wind generation, or any other type of renewable energy generation.

The central controller also stores consumption data and provides data to a user via an associated user interface display. According to a first configuration, the central controller operates as a data server for providing data through an application programming interface (API) in a client application, which can then be used to present this data to the homeowner on a client device. Once data is received by the API, the client device/program uses this information to generate graphs of energy usage, generation and/or storage on the client device. In another configuration, data pertaining to the consumer's energy consumption, generated energy, and/or storage is displayed on a display, such as an LCD touch screen display, integral with the central controller. Additionally, through a web server integrated in the controller, the display on other devices in communication with the central controller, such as a homeowner's networked PC, mobile phone, or other device, may further be used to display energy data to a user.

A communication device, such as a ZigBee radio may be implemented to facilitate communication signals between the central controller and devices within the home, while a second radio operates similarly between the central controller and the utility, such as for demand response event signals/price signals. Any communication protocol can be implemented and the present disclosure is not limited to ZigBee as one of ordinary skill in the art will appreciate. The central controller may operate as a gateway device by caching or storing information from devices within a home, such as historical power consumption data, or demand response event information from the utility. The central controller therefore provides the necessary information from the utility to the devices in home network for them to operate in accord with the utility signals and/or user preferences.

Figure 1:
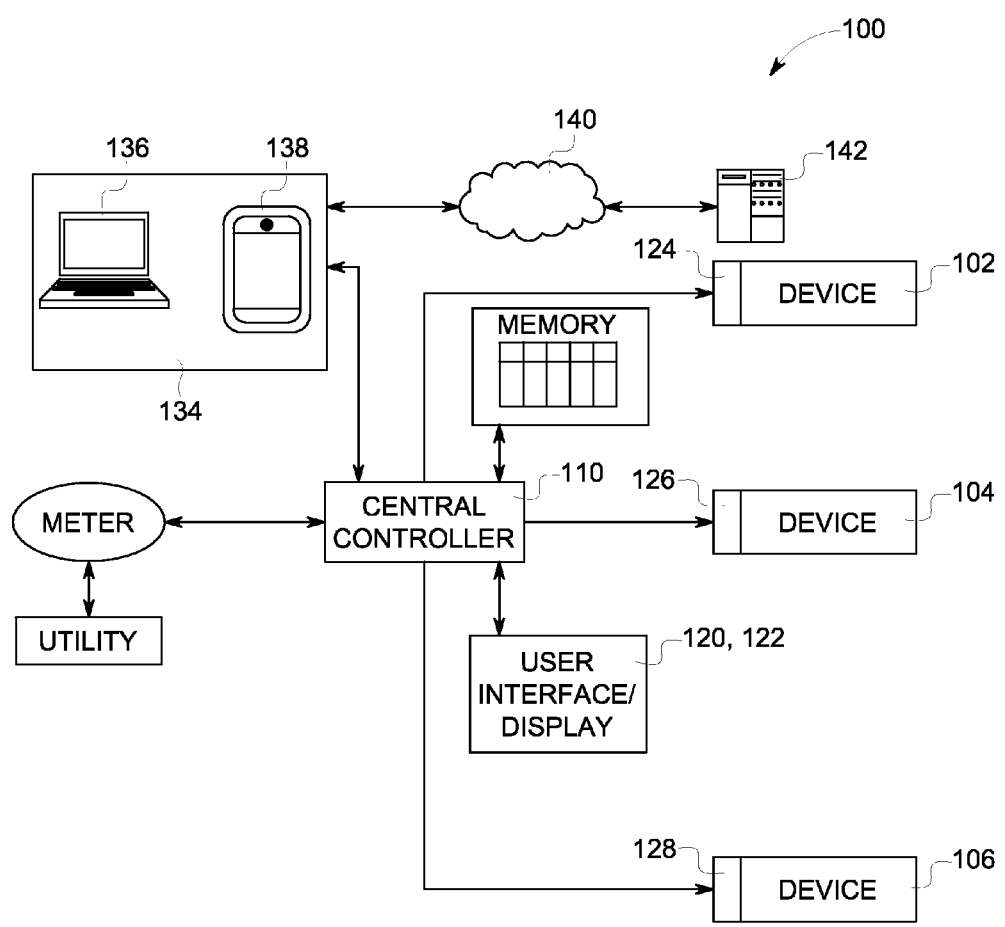
FIG. 1 is a prior art schematic illustration of an energy management system with one or more home network devices.

FIG. 1 schematically illustrates an exemplary home management system 100 for one or more energy consuming devices, such as devices 102, 104, 106. Each of the devices 102, 104, 106 can comprise one or more power consuming features/functions. For example, device 104 can be a refrigerator, an HVAC system, and/or any energy consuming device capable of having power consumption measured thereat. The devices may also be controllers, or other energy consuming devices other than appliances. The home energy management system 100 generally comprises a central device or central controller 110 for managing power consumption within a household. The controller 110 is operatively connected to each of the power consuming features/functions. The controller 110 can include a micro computer on a printed circuit board, which is programmed to selectively send signals to a device control board 124, 126, 128 of device 102, 104, and/or 106 respectively in response to the input signal it receives. When operating as a HEM, the central controller 110 may transmit signals received from the utility (via smart meter or other means) along to devices, such as appliances 102, 104, and 106 connected to a home area network (HAN). The central controller 110 controls which devices shed load by going into an energy savings mode or other power deferred state.

The controller 110 includes a user interface 120 having a display 122 and control buttons for making various operational selections. The display may include an LCD touch screen for enabling use interaction and input regarding what information is displayed, or the user interface 120 can include separate control buttons for making various operational selections. The user interface and display may comprise a cellular phone, PDA, personal computer, tablet computer, smart phone, pager, television, and the like. The controller 110 is configured to gather information and data related to current usage patterns and as well as current power costs, and generate historical usage charts therefrom. This information can be used to determine current energy usage and cost associated with using each device/appliance in at least one of the energy savings mode and normal mode. This real-time information (i.e., current usage patterns, current power cost and current energy usage/cost) can be presented to the user via the display.

A communication device, such as a ZigBee radio (802.15.4), WiFi (802.11), and an FM receiver may be implemented to facilitate communication signals between the central controller 110 and devices within the home, while a second radio operates similarly between the central controller 110 and the utility, such as for demand response event signals/price signals. The device controller 110 can also include USB ports for adding additional functionality. Any communication protocol can be implemented and the present disclosure is not limited to ZigBee as one of ordinary skill in the art will appreciate. The central controller therefore operates as a gateway device by caching or storing information from devices within a home, such as information pertaining to whether smart appliances are on or off, or demand response information from the utility. The central controller therefore provides the necessary information from the utility to the appliances/appliance microcontrollers for them to operate in accord with the utility signals and/or user preferences.

Additionally, the controller 110 is capable of connecting, via either Ethernet or WiFi, to the homeowner's router and to a client application 134 in a personal computer 136 and/or a mobile device 138 to access the Internet 140 of FIG. 1. This allows for remote service and monitoring capability. A server 142 can keep records of all homes therein that may be accessed remotely via the internet.

Figure 2:
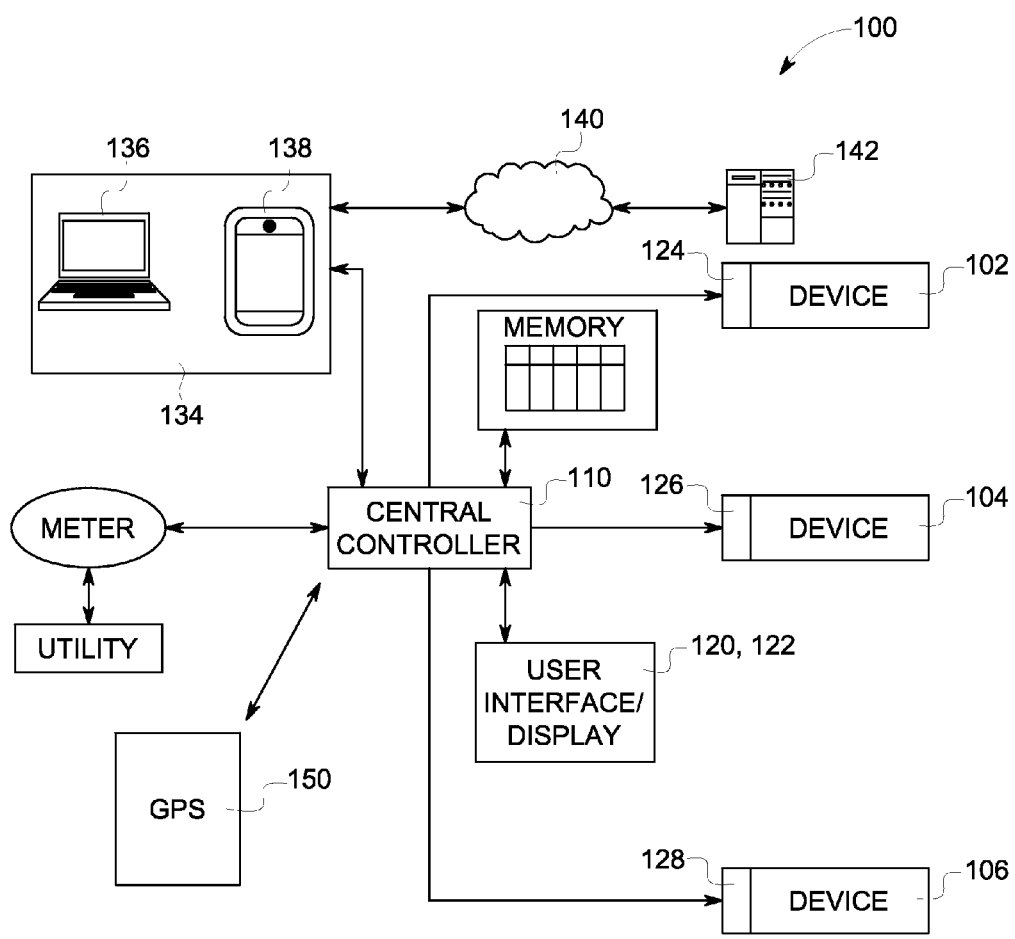
FIG. 2 is a schematic illustration of an energy management system including a GPS device in accordance with one aspect of the present disclosure.

In accordance with the present disclosure, the home energy management systems described above are configured to communicate with one or more navigational devices, such as a GPS device. (FIG. 2). As illustrated in FIG. 2, the navigation or GPS device 150 is configured to transmit location information in real-time via cellular, satellite, internet, broadband, wireless, or other network connection to the central controller 110. The GPS 150 may be a standalone designated navigational device, as shown in FIG. 2, or it may be built into a user's mobile device 138, laptop computer 136, vehicle (not shown). The GPS device 150 comprises a transceiver that is configured to calculate its position based on messages received from GPS satellites that include precise time and location information.

Each home network member in a home network may have one or more separate GPS-enabled devices. For example, a homeowner may have one GPS device built into their mobile phone and another in their vehicle. According to the present disclosure, each GPS device associated with one or more members of a home area network may be programmed to communicate with the home energy management system of the home network. This GPS-HEM/HEG relationship allows an HEM/HEG to be programmed to operate home network devices according to various behaviors based on the location of one or more home members. For example, if a home has four members, a mother, father, and two children, each member's GPS device (if applicable) may be programmed to communicate individually with the HEM/HEG system's central controller. The controller in turn may additionally communicate with the GPS-enabled devices to provide each home member with information regarding the status of the home network devices and/or the utility state and/or operational inquiries to allow for precise and tailored control of each device in a home network. The central controller may transmit signals to a member device, which may be the GPS-enabled device or a separate device, that are relayed to the member via text messages, emails, and/or voice-alerts depending on the set preferences and type of device enabled.

By monitoring the location of each home network member through the use of the GPS-enabled device, the central controller can take the member's location into consideration when determining which devices, if any, should shed load or be turned off when entering an energy savings mode. A home network member may program the central controller to dictate parameters for entering an energy savings mode based on the member's locations. For example, the central controller may be programmed such that particular devices do not enter energy savings mode while one or more members are at home. The programming specifics may change depending on which member is home, such that the devices certain members typically use will remain in normal mode while those associated members are at the home. Therefore, the central controller may automatically operate the home network devices according to the specified parameters, without the home network members noticing any disruption in service. Alternatively, the central controller may be programmed to send an alert to the members that are present in a home when an energy savings mode is about to commence, and require the members to accept this change prior to entering energy savings mode.

Home network members may additionally program a home's HEM/HEG system to include behavior modification schedules that adjust the operation of specific devices based solely on a designated member's location. The central controller includes a communication link to each member's GPS-enabled device(s), such that the controller knows the exact location and traveling direction of each home member at any time. For example, a home network member may program a behavior modification schedule that shifts the temperature setpoint on a home network's HVAC device when all the members are away from the home beyond some specified distance or time for return. When the central controller receives information that all members are particular distance away from the house and/or traveling in directions away from the house, the central controller may either send each member, or certain designated members, an inquiry as to whether the HVAC setpoint should be adjusted, or automatically adjust the HVAC setpoint to the temperature pre-programmed as part of the behavior modification schedule. The schedule remains in place until one or more member's return to the home, enter a certain distance from the home, or other pre-programmed location requirement. The behavior modification schedules may be manually cancelled at any time in the event a home network member desires the operation of any or all home network devices to vary from a pre-programmed schedule.

One example of a pre-programmed behavior modification schedule includes a "vacation mode". A home network member may set location criteria, such as when some or all of the home network members are a particular distance from home and/or traveling in directions away from the home. Vacation mode may include the modification of various energy saving device settings, such as shutting off or lowering water supply, turning off or lowering water heater setpoint temperature, turning off a home's natural gas supply line, dimming or extinguishing some or all the lights in a home, turning on some or all the lights in a home, closing a garage, lowering a household thermostat setting, shutting off appliances, such as a dishwasher, range, dryers, washers, or other devices that may have inadvertently been left on, for example, making certain that an iron or coffee-maker is disabled by connecting such devices to a load switch that responds to inputs from the controller, and any other pre-programmed behavior desired by a home network member.

One example of a pre-programmed behavior includes setting operation parameters for a vacation mode. The HEM/HEG may be programmed to enter vacation mode when each home member is at least a certain minimum distance, such as 100 miles, away from the home. Once the controller determines, via the GPS-enabled device, that each member, either together at the same location, or separate, are a minimum of 100 miles from the home, the controller either sends one or more an inquiry to one or more home network members' enabled devices requesting confirmation to enter vacation mode, or the controller automatically enters vacation mode without requesting confirmation, depending on the pre-programmed specification. The vacation mode may further include requirement for returning to normal operational settings, such as when at least one member comes within a certain minimum distance from the home, to ensure that the home is back to full operation when the members return.

Figure 3:
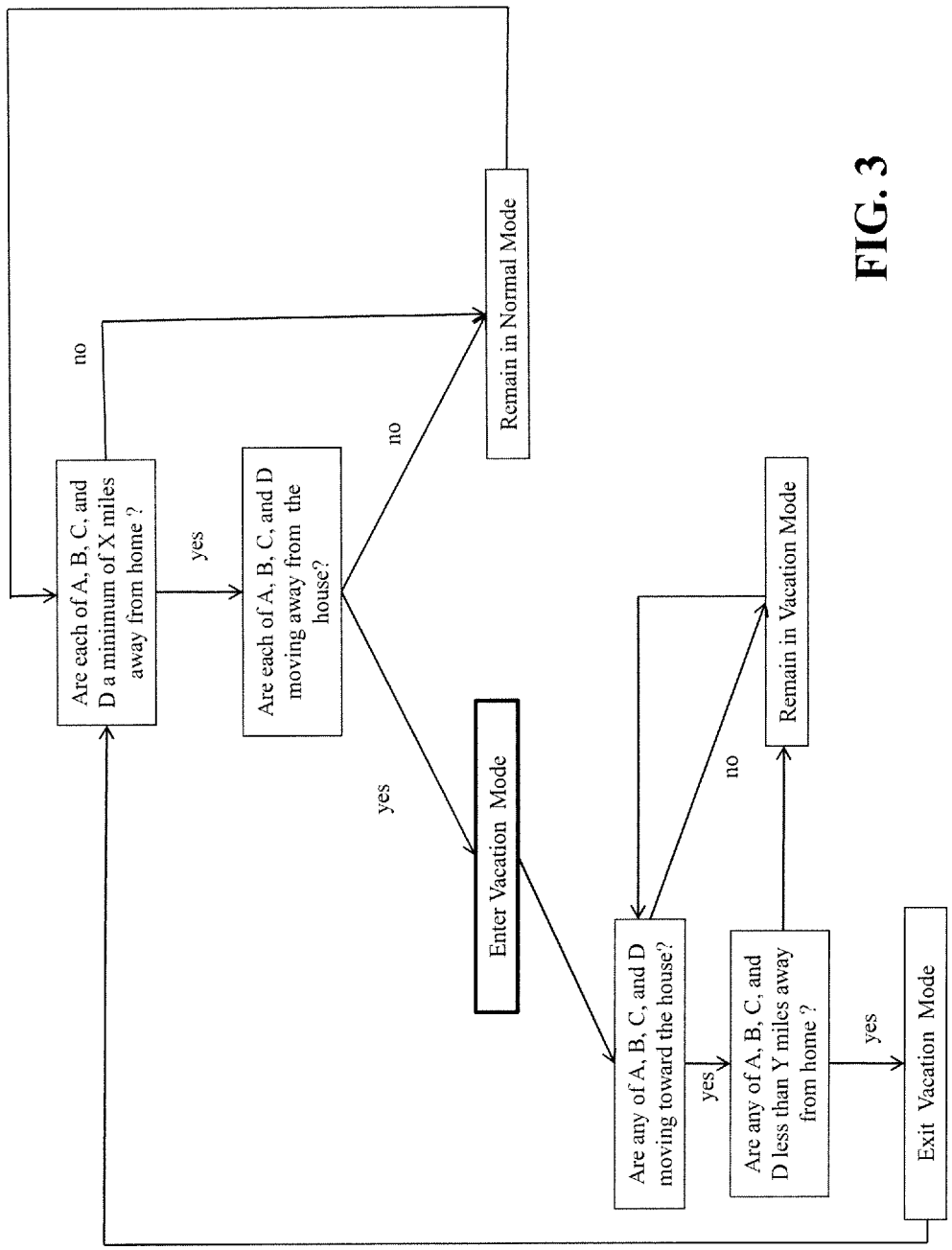
FIG. 3 is an exemplary flow chart illustrating one aspect of operation of the energy management system according to another aspect of the present disclosure.

FIG. 3 illustrates an exemplary programming setup for entering and exiting vacation mode. First, the controller receives a signal from each members' (A, B, C, and D) GPS-enabled device indicating that each member of a household (A, B, C, and D) are a minimum of "X" miles from the home. If the signal further indicates that each of A, B, C, and D are moving away from the house, the controller automatically initiates vacation mode. Once in vacation mode, if the controller receives a signal from at least one of A, B, C, or D's GPS-enabled device indicating movement back toward the home, and that person comes within a minimum of "Y" miles from the home, the central controller will exit vacation mode, and once again operate the home network according to normal settings. As indicated above, the requirements for entering and exiting vacation mode may be customized by each homeowner. Additionally, the homeowner may choose to program more than one vacation modes that each include different requirements and/or invoke different HEM/HEG settings.

Additionally, the system can incorporate a "local travel mode" that may take effect when the GPS-enabled devices of each home network member indicate that one or more of the members are away from the home, but remain local, such as within "Z" miles from the home, and therefore do not invoke vacation mode. The behavior modification schedule associated with a local travel mode may include less pronounced adjustments than seen with the vacation mode. For example, the thermostat temperature and water heater set points may each be lowered, but perhaps to a lesser degree than seen with vacation mode. Therefore, when the GPS-enabled device of at least one of the home network member indicates a member is traveling back to the home, the home can return to the normal settings in time for the members arrival.

Behavior modification schedules may further be programmed that correspond to a variety of different scenarios based on the location of each home member. For instance, one schedule may correspond to the household's work schedule (work mode). The schedule includes location criteria in view of one or more home network member's work schedules. For example, the criteria may include the location of a member's workplace along with a window of time in which the member generally travels to the workplace. When the member's GPS-enabled device indicates to the central controller that the member is traveling in the direction of work within the proper time window, the controller knows to initiate "work mode". Similarly, the controller would execute the "home mode" when travel was sensed as traveling in the direction of home.

If a household includes more than one member, each member's routine criteria can be included in a single work mode schedule. For example, if a household includes two members, one that travels to work Monday-Friday around 8 am and leaves work at about 5 pm, and the other member travels to school on Monday, Wednesday, and Fridays at about 10 am and leaves school at around 8 pm, the location criteria for each member is required to be met prior to the initiation of work mode. To exit work mode, however, only one member has to meet the exit mode requirements, to ensure that home devices are functioning properly when each member is home. Accordingly, in the above scenario, on a typical day work mode would initiate around 10 am and would be cancelled around 5 pm. Since each member's GPS-enabled device can detect precise locations and travel patterns, if one or more members do not travel according to the typical path, the controller may send an inquiry to the member(s) requesting confirmation that a particular behavior modification schedule should nonetheless be initiated, or if alternative action should be taken.

The GPS-HEM/HEG system may further provide a monitoring feature, such as a "tracking mode" that enables the controller to monitor the movements and real-time location of all participants that are associated with the system and display their whereabouts on a user interface of the energy management system. For example, if a home network member is at home and discovers an urgent or recent need for supplies, such as cooking ingredients, toiletries, tools, etc., the member could initiate the tracking mode and if any mobile users are nearby a retail outlet where such items can be purchased. The home member can then send the mobile user an alert, requesting that the mobile user pick up the needed items. Additionally, the monitoring feature allows parents or guardians to monitor the locations of teenagers, new drivers, young children, etc., for safety purposes. The system may include parental controls, wherein the mobile devices of children may be programmed such that the children cannot disable the monitoring feature.

The GPS-enabled devices are additionally configured to provide the central controller with an estimated arrival time for each home network member. The GPS-enabled device detects a member's location, travel direction, traffic, and speed, and determines an estimated arrival time based on one or more of these variables. A home network member may therefore create various behavior modification schedules that are programmed to initiate when the member is estimated to arrive at home within a certain time frame. For example, a home network member creates a schedule for coming home from work on weekdays. This schedule may include turning the outdoor/indoor lights on and increasing the temperature on the thermostat and is programmed to initiate when the member is estimated at 20 minutes from home. Based on the information provided by the GPS, the controller will know when the member is scheduled to arrive home and initiate this schedule accordingly. The member additionally may enter any planned stops into their personal device associated with the HEM/HEG or directly onto their GPS-enabled device, such as a grocery store or gasoline stop, and the GPS can consider this when providing the central controller with an arrival estimation.

Further, based on a home network member's location, the central controller may present pre-programmed inquiries to a member based on the member's location. For example, if the GPS indicates that a member is traveling towards home at any time, the central controller may send an inquiry as to whether any action should be taken, such as turning up the thermometer, turning on lights, dishwasher, and the like. In another example, the GPS indicates that each member, or at least each adult member, has left the house. A message may then be sent to the designated homeowner inquiring if the burglar alarm should be set if it was not. The central controller may also alert the user that one or more device has been left active after all the members left the house, such as lights, oven, space heater, hair styling products, irons, coffeemakers, pool pumps, and the like, and the homeowner can choose to leave the device active, or have the device turned off.

Figures 4A, 4B:
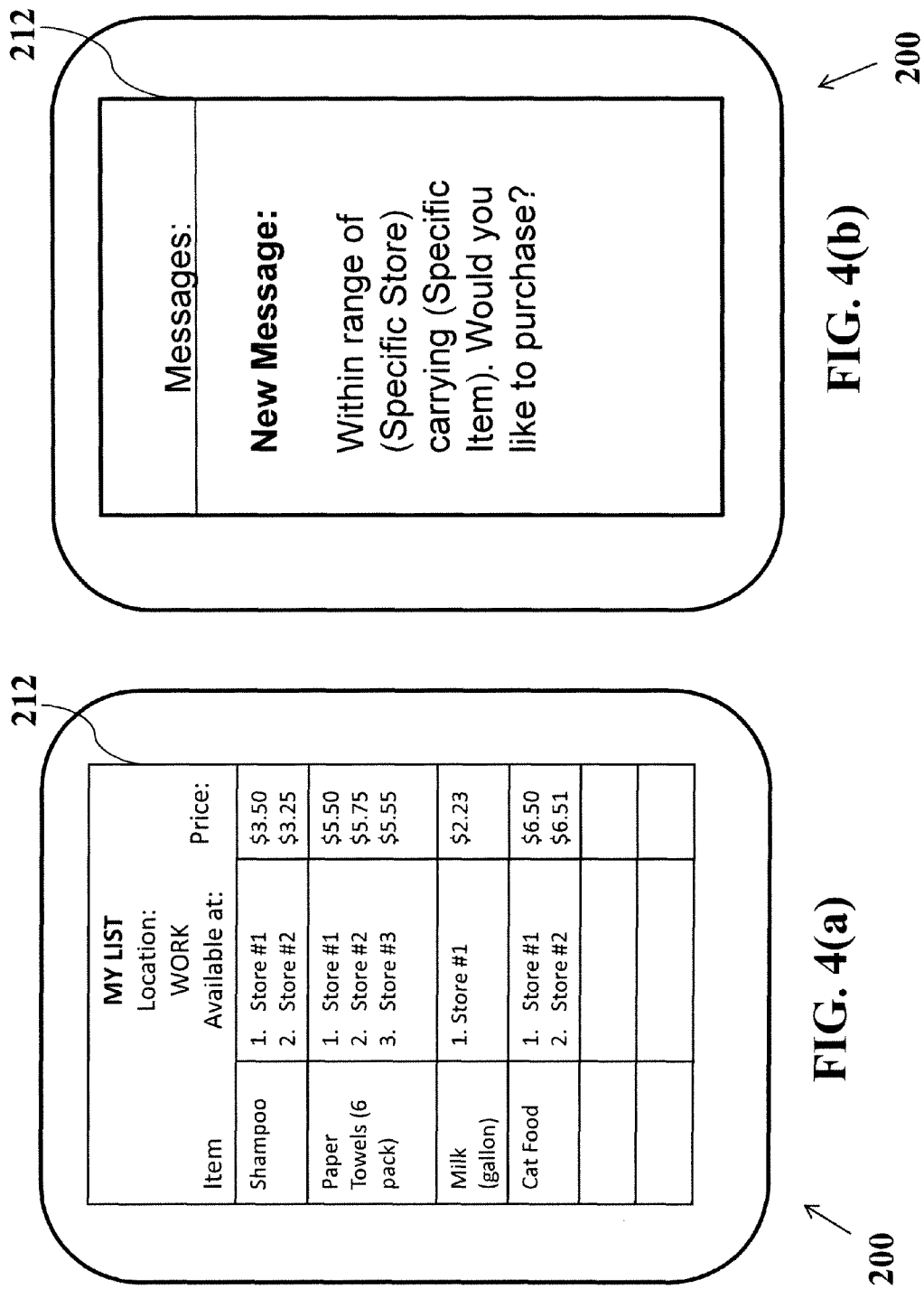
FIG. 4(a) is an exemplary illustration of a shopping list displayed on a portable device according to another aspect of the present disclosure.
FIG. 4(b) is an exemplary illustration of a message received on a portable device in accordance with another aspect of the present disclosure.

The HEM/HEG system may further include an application for storing and managing the shopping list for one or more home network member. FIGS. 4(a) and (b) illustrates an exemplary portable device 200 with a display 212. FIG. 4(a) shows an exemplary shopping list presented to the home network member on the display 212 and the design of the list may be personalized according to a home network member's needs. The shopping list may include a list of items to be purchased, along with the local stores these items may be found, price comparisons for the items found at different stores, and the like. The application enables members to prioritize the items, designating items that are urgent, needed within one week, needed within a month, needed within any designated certain date, items that are important but not necessary, items that are only desired, etc. If multiple stores are identified, the member can select a store on the list and the application may then provide directions to the store from the person's GPS-identified location. The shopping list may be personalized by specifying the home network member's preferred stores and the preferred locations of the stores depending on where the member is located. For example, if the GPS-device determines that the member is at work, the shopping list may adjust the stores included in the list to the member's preferred stores within a designated radius of the member's workplace. When the member is within a particular proximity of one of the store locations, the central controller may send the homeowner an alert, such as a text message. (FIG. 4(b)) If the member decides to stop and purchase the item, the member can respond, such as by email or text.

Each home network member may enter, upload, and/or manage separate shopping lists, such that a homeowner may have a separate list than the homeowner's spouse and/or children. Each member enters and prioritizes items on their designated list and the central controller sends alerts only to the corresponding member, unless otherwise programmed. For example, if a home network includes three members, a father, mother, and school-age child, and each member has a separately authored and managed list, only the mother will receive alerts regarding the items on the mother's list, and so on. However, the central controller may be programmed such that multiple members have access to manage and receive updates regarding the items on another member's list. Accordingly, if the child is in school and is informed that he or she needs a particular type of school supply, the child can enter the required item into their associated portable device associated with the HEM/HEG, such as a cellular phone, and the child's parents will receive an alert indicating that the child's list was updated and they would be able to view the location and price of the item. Alternatively, the lists can be made private, such that only the designated member may update and manage the list, and alerts are only sent to the member corresponding to the particular shopping list. If the home network member's associated mobile device includes the member's calender, the controller may be programmed to update a member's shopping list to include a reminder to buy a gift for an upcoming special occasion included in the calender, such as an anniversary, birthday, etc. This could be helpful for forgetful spouses, friends, family members who may need reminders with gifts for special occasions.

As referred to above, a home network member can communicate back to the central controller in response to an alert. The member can provide a variety of responses via text, email, or verbal cues, to provide various feedbacks, such as confirming purchase of the item that prompted the alert, selecting to postpone the purchase of the item to a later date, deleting the item from the list, etc. If the purchase of an item is postponed, the member can designate how long to postpone the shopping reminder, such as for one day, week, month, and so on. The alerts can additionally be tailored to provide a reminder alert to ensure that the member does not get distracted and forget to buy the intended item. Upon receiving the initial alert that a store location is within range, the member can provide a response indicating the intention to purchase the item. The reminder alert may then be activated to provide a reminder a particular amount of time after responding to an initial alert.

Additionally, the central controller may include a household monitoring application configured to store a number of cooking recipes and monitor grocery items in the home to assist in meal preparation and menu management. A home network member can load recipes into the central controller such that each recipe can be categorized and stored. As the groceries are stocked in the refrigerator and cupboards, the member can enter the items into the controller, such as by scanning the item's barcode or manually entering the item description and amount. Household staples, such as spices, oils, vinegars, condiments, etc. are also entered, such that the application has a complete view of the items available for cooking. The application is configured to track each item in the refrigerator and cupboards and can be updated at any time from either the central controller or remotely from a member's personal device such as a computer or cellular phone. Preferably, whenever a grocery item is consumed or the amount of the item is reduced, the application may be updated to ensure that the item list is accurate. A home network member may select a recipe and the application then searches the database to determine whether the required items are in the home. If not, the application may create a shopping list for the household member, or add to any existing shopping list, and may further list stores that carry the items within a radius of the member's GPS-determined location, price comparisons of the items available at more than one store, traffic around the store location, etc. Once the homeowner has completed a recipe, the application can automatically update the list of available items in the home.

The household monitoring application is applicable to uses other than cooking, such as cleaning, laundry, and maintenance of home network devices. For example, a home network member can enter items into the central controller, such as dishwasher detergent and laundry detergent, and the amount that the item includes, such as weight, estimated loads, etc. Since the central controller can monitor the operation of home network devices, the application will be aware of each cycle and can track the usage of items, such as detergent, based on the recommended or typical detergent use per load. Accordingly, when the detergent is nearing empty, the central controller sends an alert to the home network member indicating the upcoming need to purchase detergent or other item, and this item is included in the home network member's shopping list, along with the information of nearby stores, price comparisons at different store, traffic information around the stores, etc. The member can choose to postpone buying the item for a particular number of hours, days, months, etc., or can cancel the alert all together.

Device parts with a use-driven lifespan, such as filters, can also be monitored by the central controller to notify home network members when the items need to be replaced. For example, when a new water filter is purchased, the item description, brand, product number, etc. are entered into the controller, either manually or by scanning the item barcode, and the application tracks the usage of the filter and alerts the homeowner when there is a need to replace the filter. This item can be placed on the home network member's shopping list, or on a separate list, if so preferred. For example, the central controller may keep track of HVAC run times and alert the homeowner of the impending need to purchase a new filter. Once the homeowner accepts the recommendation, the central controller adds the filter to the shopping list and alerts the home network member when they are in proximity to a store that may stock the filter. Using the internet, the controller can search for available filters that meet the filter requirements in the vicinity of the home network member and provide alerts regarding the available filters without any input from the member. The central controller may also provide price comparisons to the home network member when the required filter is available at more than one location.

The above descriptions of various shopping lists created and managed by applications of the HEM/HEG systems are preferably monitored concurrently, such that if the GPS-enable device recognizes that a home network member is at a particular store and sends this information to the central controller, the controller will review each list corresponding to the member, if lists are created separately, and indicate if there are other items on a list that are available at the particular store. If the member has designated specific priorities to the items, the member's device will indicate the priority of the items so that the member can determine whether or not to purchase the item.

The central controller may further monitor the weather conditions associated with each home network member's GPS-determined location. By monitoring the real-time weather conditions and potential weather alerts such as tornadoes, flooding, high wind, etc., the central controller can alert each home network member of a weather event and proximity to the zone or location in jeopardy. For example, if one home member is driving toward a location that is subject to a tornado warning, the central controller may send the member an alert on the member's portable device indicating the tornado warning and the distance the member is from the location. The central controller may also offer alternative routes to avoid the affected weather area. In the event the member is in the affected location, the central controller can send an alert indicating at least one route to take to exit the affected location.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method of managing a home energy management system based on the location of at least one member of a home network, said energy management system comprising a network of energy consuming devices and a central controller operatively connected to said energy consuming devices, said method comprising:
    communicatively coupling a GPS-enabled device to said central controller;
    determining the location of said at least one member using the GPS-enabled device;
    communicating the location of said at least one member to said central controller;
    operating one or more energy consuming devices according to a pre-programmed schedule when designated location criteria is met;
    monitoring, through a track mode, the movements and real-time location of said at least one member; and
    displaying said real-time location on a display.

2. A GPS-based energy management system for a home network comprising a plurality of energy consuming devices, said system comprising:
    a central controller operatively connected to each energy consuming device;
    one or more GPS-enabled devices configured to communicate with said central controller, wherein said central controller is programmed to modify the behavior of the energy consuming devices based on the location of at least one member of a home network; and
    a tracking mode programmed to monitor the movements and real-time location of said at least one member and display said real-time location on a display.

3. The GPS-based energy management system of claim 2, wherein said GPS-enabled device comprises one or more of a mobile phone, computer, vehicle, and standalone GPS navigation device.

4. The GPS-based energy management system of claim 2, wherein the controller is programmed with one or more behavior modification schedules based on pre-programmed location criteria for said at least one member.

5. The GPS-based energy management system of claim 4, wherein said one or more behavior modification schedules require confirmation by at least one member of said at least one member of the home network prior to initiating.

6. The GPS-based energy management system of claim 4, wherein said one or more behavior modification schedules comprise one or more of a vacation mode, work mode, local travel mode, and school mode.

7. The GPS-based energy management system of claim 4, wherein said one or more behavior modification schedules are manually cancellable.

8. The GPS-based energy management system of claim 4, wherein at least one of said one or more behavior modification schedules initiates automatically when the location criteria is satisfied.

9. The GPS-based energy management system of claim 4, wherein said pre-programmed location criteria comprises travel schedules to and from daily destinations, including one or more of school, work, travel, and social functions.

10. The GPS-based energy management system of claim 4, wherein said one or more behavior modification schedules comprise one or more of: (i) shutting off, turning on, lowering, and increasing water supply; (ii) turning off, starting, increasing, and lowering water heater setpoint temperature; (iii) turning off and turning on a home's hydrocarbon fuel supply; (iv) dimming and extinguishing some or all lights inside/outside a home; (v) turning on some or all lights inside/outside a home; (vi) shutting off, turning on, and adjusting household energy consuming devices; (vii) closing and opening a garage door; (viii) activating and deactivating a home security system; and (ix) lowering and increasing a household thermostat setting.

11. The GPS-based energy management system of claim 4, wherein said one or more GPS-enabled devices is configured to provide said central controller with an estimated arrival time for at least one member of said at least one member of the home network.

12. The GPS-based energy management system of claim 11, wherein said one or more behavior modification schedules are programmed to initiate when at least one member of said at least one member of the home network is within the estimated arrival time.

13. The GPS-based energy management system of claim 2, wherein said behavior modification comprises at least one of: (i) shutting off, turning on, lowering, and increasing water supply; (ii) turning off, starting, increasing, and lowering water heater setpoint temperature; (iii) turning off and turning on a home's hydrocarbon fuel supply; (iv) dimming and extinguishing some or all lights inside or outside a home; (v) turning on some or all lights inside or outside a home; (vi) shutting off, turning on, and adjusting household energy consuming devices; (vii) closing and opening a garage door; (viii) activating and deactivating a home security system; and (ix) lowering and increasing a household thermostat setting.

* * * * *

UNITED STATES PATENT AND TRADEMARK OFFICE
CERTIFICATE OF CORRECTION

PATENT NO. : 8,798,804 B2  
APPLICATION NO. : 12/985387  
DATED : August 5, 2014  
INVENTOR(S) : Besore et al.

Page 1 of 1

It is certified that error appears in the above-identified patent and that said Letters Patent is hereby corrected as shown below:

In the Specification

In Column 1, Lines 11-12, delete "home energy gateway (BEG)" and insert -- home energy gateway (HEG) --, therefor.

Signed and Sealed this  
Twelfth Day of May, 2015

Michelle K. Lee  
*Director of the United States Patent and Trademark Office*